United States Patent
Tamilselvam et al.

(10) Patent No.: US 12,430,146 B2
(45) Date of Patent: Sep. 30, 2025

(54) VISUALIZATION FOR SPLITTING AN APPLICATION INTO MODULES

(71) Applicant: International Business Machines Corporation, Armonk, NY (US)

(72) Inventors: Srikanth Govindaraj Tamilselvam, Chennai (IN); Amith Singhee, Bangalore (IN); Shivali Agarwal, Ghaziabad (IN); Utkarsh Milind Desai, Bangalore (IN); Raunak Sinha, Noida (IN)

(73) Assignee: International Business Machines Corporation, Armonk, NY (US)

( * ) Notice: Subject to any disclaimer, the term of this patent is extended or adjusted under 35 U.S.C. 154(b) by 503 days.

(21) Appl. No.: 17/069,487

(22) Filed: Oct. 13, 2020

(65) Prior Publication Data

US 2022/0113989 A1 Apr. 14, 2022

(51) Int. Cl.
 G06F 9/451 (2018.01)
 G06F 8/60 (2018.01)
 G06F 9/445 (2018.01)
 G06F 11/30 (2006.01)
 G06F 11/32 (2006.01)

(52) U.S. Cl.
 CPC ............ *G06F 9/44578* (2013.01); *G06F 8/60* (2013.01); *G06F 9/44505* (2013.01); *G06F 9/451* (2018.02); *G06F 11/302* (2013.01); *G06F 11/324* (2013.01)

(58) Field of Classification Search
 CPC ... G06F 8/60; G06F 9/451; G06F 8/72; G06F 11/32; G06F 9/445; G06F 11/36
 See application file for complete search history.

(56) References Cited

U.S. PATENT DOCUMENTS

| 10,430,250 B2 | 10/2019 | Ishikawa et al. |
| 10,579,370 B2 | 3/2020 | Gupta |
| 2002/0138787 A1* | 9/2002 | Pal ...................... G06F 11/3696 714/E11.21 |
| 2005/0033457 A1* | 2/2005 | Yamane ............... G05B 19/056 700/18 |

(Continued)

FOREIGN PATENT DOCUMENTS

WO WO2019209231 A2 10/2019

OTHER PUBLICATIONS

Azure Architecture Center, "Monoliths to microservices using domain-driven design", Nov. 4, 2019, 7 pages, Microsoft Docs.

(Continued)

*Primary Examiner* — Phenuel S Salomon
(74) *Attorney, Agent, or Firm* — Teddi Maranzano

(57) ABSTRACT

One embodiment provides a computer implemented computer implemented method, including: receiving information describing an application to be split into a plurality of modules to be hosted on a remote services environment; identifying a plurality of possible sets of modules for splitting the application; providing a visualization of the application split into modules, wherein the visualization displays different possible sets of modules as different layers within the visualization; and splitting, responsive to receiving user input within the visualization selecting one of the different layers, the application into one of the different possible sets of modules based upon the one of the different layers.

20 Claims, 5 Drawing Sheets

(56) References Cited

U.S. PATENT DOCUMENTS

| | | | | |
|---|---|---|---|---|
| 2012/0116561 | A1* | 5/2012 | Nakagawa | G05B 19/0426 |
| | | | | 700/97 |
| 2013/0246528 | A1* | 9/2013 | Ogura | H04L 67/563 |
| | | | | 709/204 |
| 2015/0304243 | A1* | 10/2015 | Jasperson, Jr. | H04L 47/76 |
| | | | | 709/225 |
| 2017/0187785 | A1 | 6/2017 | Johnson et al. | |
| 2017/0364434 | A1* | 12/2017 | Kairali | G06F 11/3668 |
| 2018/0069806 | A1* | 3/2018 | Kumar | H04L 47/827 |
| 2019/0098106 | A1* | 3/2019 | Mungel | H04L 67/564 |
| 2019/0108067 | A1* | 4/2019 | Ishikawa | H04L 41/50 |
| 2019/0138280 | A1* | 5/2019 | Ma | G06F 8/60 |
| 2020/0042315 | A1* | 2/2020 | Gupta | G06F 8/36 |
| 2021/0021643 | A1* | 1/2021 | Nakagoe | H04L 67/34 |
| 2021/0157476 | A1* | 5/2021 | Qiu | G06F 3/04847 |
| 2021/0216444 | A1* | 7/2021 | Gefen | G06F 11/3672 |
| 2021/0263735 | A1* | 8/2021 | Harishankar | G06F 8/31 |

OTHER PUBLICATIONS

Jan Stenberg, "Strategies for Decomposing a System into Microservices", Jun. 21, 2018, 3 pages, available at: https://www.infoq.com/news/2018/06/decomposing-system-microservices/.

Remus Pereni, "From monoliths to micro services using DDD and Mikado", Accessed on Jun. 25, 2020, 7 pages, available at: https://www.todaysoftmag.com/article/2242/from-monoliths-to-micro-services-using-ddd-and-mikado.

Holger Knoche et al., "Using Microservices for Legacy Software Modernization", 2018, 6 pages, IEEE Computer Society.

Genc Mazlami et al., "Extraction of Microservices from Monolithic Software Architectures", IEEE 24th International Conference on Web Services, 2017, 8 pages, IEEE Digital Library.

Adambarage Anuruddha Chathuranga De Alwis et al., "Function-Splitting Heuristics for Discovery of Microservices in Enterprise Systems", Sep. 2018, 15 pages.

Jonas Fritzsch et al., "From Monolith to Microservices: A Classification of Refactoring Approaches", Software Engineering Aspects of Continuous Development and New Paradigms of Software Production and Deployment First International Workshop, DEVOPS 2018, Chateau de Villebrumier, France, Mar. 5-6, 2018, 14 pages.

Holger Harms et al., "Guidelines for Adopting Frontend Architectures and Patterns in Microservices-Based Systems", ESEC/FSE '17, Sep. 4-8, 2017, Paderborn, Germany, 6 pages, ACM Digital Library.

Mohammad Javad Amiri, "Object-aware Identification of Microservices", 2018 IEEE International Conference on Services Computing, 4 pages, IEEE Computer Society.

Zhongshan Ren et al., "Migrating Web Applications from Monolithic Structure to Microservices Architecture", Internetware '18, Sep. 16, 2018, Beijing, China, 10 pages, ACM Digital Library.

Wuxia Jin et al., "Functionality-oriented Microservice Extraction Based on Execution Trace Clustering", 2018 IEEE International Conference on Web Services, 8 pages, IEEE Computer Society.

Luis Nunes et al., "From a Monolith to a Microservices Architecture: An Approach Based on Transactional Contexts", European Conference on Software Architecture, 2019, /// pages, SpringerLink.

Luciano Baresi et al., "Microservices Identification Through Interface Analysis", European Conference on Service-Oriented and Cloud Computing, Sep. 2017, 16 pages, ResearchGate.

Hulya Vural et al., "A Case Study on Measuring the Size of Microservices", Jul. 2018, 11 pages, ResearchGate.

* cited by examiner

VISUALIZATION FOR SPLITTING AN APPLICATION INTO MODULES

BACKGROUND

With the increase in remote computing or services environments, for example, remote network environments, cloud computing environments, and the like, more users and entities are moving the hosting of applications and other services to the remote services environment. By moving the hosting of applications and other services to the remote services environment, the users and other entities are able to reduce the use of internal resources (e.g., infrastructure, computing resources, human resources, etc.) and reduce other costs associated with the application and other services. Additionally, since the remote services environment usually has significantly more resources, particularly, computing resources, than the user or entity has locally, the user or entity is able to scale the application that is being hosted on the remote services environment.

BRIEF SUMMARY

In summary, one aspect of the invention provides a computer implemented method, including: receiving information describing an application to be split into a plurality of modules to be hosted on a remote services environment; identifying a plurality of possible sets of modules for splitting the application; providing a visualization of the application split into modules, wherein the visualization displays different possible sets of modules as different layers or overlays within the visualization; and splitting, responsive to receiving user input within the visualization selecting one of the different layers or overlays, the application into one of the different possible sets of modules based upon the one of the different layers or overlays.

Another aspect of the invention provides an apparatus, including: at least one processor; and a computer readable storage medium having computer readable program code embodied therewith and executable by the at least one processor, the computer readable program code including: computer readable program code configured to receive information describing an application to be split into a plurality of modules to be hosted on a remote services environment; computer readable program code configured to identify a plurality of possible sets of modules for splitting the application; computer readable program code configured to provide a visualization of the application split into modules, wherein the visualization displays different possible sets of modules as different layers or overlays within the visualization; and computer readable program code configured to split, responsive to receiving user input within the visualization selecting one of the different layers or overlays, the application into one of the different possible sets of modules based upon the one of the different layers or overlays.

An additional aspect of the invention provides a computer program product, including: a computer readable storage medium having computer readable program code embodied therewith, the computer readable program code executable by a processor and including: computer readable program code configured to receive information describing an application to be split into a plurality of modules to be hosted on a remote services environment; computer readable program code configured to identify a plurality of possible sets of modules for splitting the application; computer readable program code configured to provide a visualization of the application split into modules, wherein the visualization displays different possible sets of modules as different layers or overlays within the visualization; and computer readable program code configured to split, responsive to receiving user input within the visualization selecting one of the different layers or overlays, the application into one of the different possible sets of modules based upon the one of the different layers or overlays.

For a better understanding of exemplary embodiments of the invention, together with other and further features and advantages thereof, reference is made to the following description, taken in conjunction with the accompanying drawings, and the scope of the claimed embodiments of the invention will be pointed out in the appended claims.

DETAILED DESCRIPTION

Figure 1:
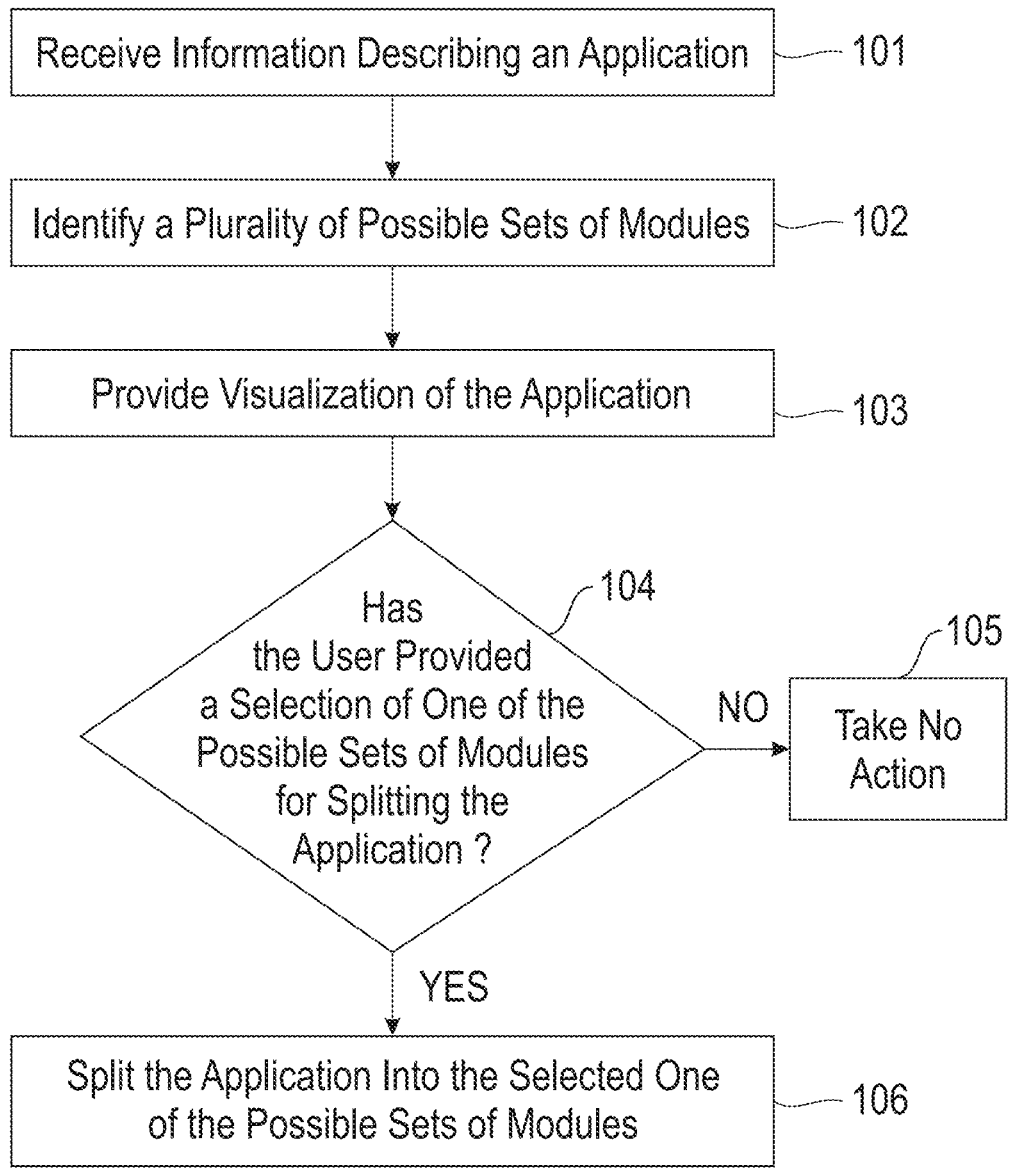
FIG. 1 illustrates a method of identifying sets of modules that an application can be split into and providing a visualization for a user to see the possible module sets, interact with the visualization, and select, within the visualization, a set of modules that the application should be split into.

It will be readily understood that the components of the embodiments of the invention, as generally described and illustrated in the figures herein, may be arranged and designed in a wide variety of different configurations in addition to the described exemplary embodiments. Thus, the following more detailed description of the embodiments of the invention, as represented in the figures, is not intended to limit the scope of the embodiments of the invention, as claimed, but is merely representative of exemplary embodiments of the invention.

Reference throughout this specification to "one embodiment" or "an embodiment" (or the like) means that a particular feature, structure, or characteristic described in connection with the embodiment is included in at least one embodiment of the invention. Thus, appearances of the phrases "in one embodiment" or "in an embodiment" or the like in various places throughout this specification are not necessarily all referring to the same embodiment.

Furthermore, the described features, structures, or characteristics may be combined in any suitable manner in at least one embodiment. In the following description, numerous specific details are provided to give a thorough understanding of embodiments of the invention. One skilled in the relevant art may well recognize, however, that embodiments of the invention can be practiced without at least one of the specific details thereof, or can be practiced with other methods, components, materials, et cetera. In other instances, well-known structures, materials, or operations are not shown or described in detail to avoid obscuring aspects of the invention.

The illustrated embodiments of the invention will be best understood by reference to the figures. The following description is intended only by way of example and simply illustrates certain selected exemplary embodiments of the invention as claimed herein. It should be noted that the flowchart and block diagrams in the figures illustrate the architecture, functionality, and operation of possible implementations of systems, apparatuses, methods and computer program products according to various embodiments of the invention. In this regard, each block in the flowchart or block diagrams may represent a module, segment, or portion of code, which comprises at least one executable instruction for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Specific reference will be made here below to FIGS. 1-5. It should be appreciated that the processes, arrangements and products broadly illustrated therein can be carried out on, or in accordance with, essentially any suitable computer system or set of computer systems, which may, by way of an illustrative and non-restrictive example, include a system or server such as that indicated at 12' in FIG. 5. In accordance with an example embodiment, most if not all of the process steps, components and outputs discussed with respect to FIGS. 1-4 can be performed or utilized by way of a processing unit or units and system memory such as those indicated, respectively, at 16' and 28' in FIG. 5, whether on a server computer, a client computer, a node computer in a distributed network, or any combination thereof.

One problem with moving applications to a remote services environment for hosting is that it is difficult if not impossible to move an entire application to the remote services environment. Specifically, the remote services environment is better equipped to run smaller portions of an application, called micro services. Thus, a single application needs to be broken or split into smaller modules, portions, or micro services in order to be moved to and effectively hosted by the remote services environment. The difficult thing about splitting an application into modules is that there are many different techniques for splitting an application. For example, one user may choose to split an application based upon most used services, whereas another user may choose to split the same application based upon resource usage by services. Different techniques for splitting the application result in contrasting partitions between the techniques, or overlapping partitions. Thus, choosing how to split the application is very dependent on the user and the chosen technique may not end up being the best technique for moving the application to the remote services application.

Accordingly, an embodiment provides a system and method for identifying sets of modules that an application can be split into and providing a visualization for a user to see the possible module sets, interact with the visualization, and select, within the visualization, a set of modules that the application should be split into. The system receives information describing an application that is to be split into a plurality of modules to be hosted on a remote services environment. The information may include the source file of the application, code corresponding to the application, or the like. Using the information describing the application and any additional information that the system may infer about the application, for example, the location of access points, function of particular code, number of classes, programming language, and the like, the system automatically identifies sets of possible modules for splitting the application. Each set of modules is independent of the other sets. In other words, each set of modules corresponds to a different splitting technique and may, therefore, having contrasting or overlapping partitions or modules as compared to another set of modules.

Once the system identifies the possible sets of modules, the system provides a visualization to the user. This visualization is interactive and allows the user to manipulate different overlays or layers in order to visualize how the application would be split up if a particular splitting technique was chosen. Thus, the visualization includes different layers where each layer may represent a different set of modules. Alternatively, or additionally, some layers may represent different functions, metrics, or attributes of the application. Thus, the user could select a different layer to understand how a particular split of the application would affect the performance of the application. The system may also recommend a particular splitting technique based upon user provided feedback or constraints that the user has previously provided. Once the user has selected a splitting technique within the visualization, the system can split the application into the modules corresponding to the splitting technique chosen by the user within the visualization. Providing the multi-layer or multi-overlay feature visualization of the different splitting techniques enables the users to compare and study the benefits of different splits by metrics as well as understanding how the module gets grouped. This allows the user to obtain a complete mental design of how the module set should be formed by modifying the module set of the closest overlay output.

Such a system provides a technical improvement over current systems for moving applications to a remote services environment. Rather than relying on a user to manually choose how to split an application, the described system is able to provide recommendations regarding how the application can be split. Additionally, since the described system provides an interactive visualization of the different techniques for splitting the application, the user can look at the application splits from different perspectives and choose the splitting technique that would be most advantageous when moving the application to a remote services environment. Thus, the described system and method provides a more efficient and effective technique for splitting applications into modules or micro services for hosting on the remote services environment than conventional techniques that rely on a user to select the splitting technique.

FIG. 1 illustrates a method for identifying sets of modules that an application can be split into and providing a visualization for a user to see the possible module sets, interact with the visualization, and select, within the visualization, a set of modules that the application should be split into. At 101, the system receives information describing an application to be split into a plurality of modules to be hosted on a remote services environment. The application may be a monolith application, meaning it is a single-tiered software application in which the user interface and data access code are combined into a single program from a single platform. In other words, the application can run independently and does not need to access other services or micro services to perform the intended function(s). The application is an application that a user wants to split into different modules so that it can be hosted on a remote services environment. In other words, the user wants to convert the application from a monolith application into a micro services application.

The information may be input artefacts that may include a source file of the application, code corresponding to the application, a binary source file, or the like. In other words, the information describing the application comprises information that identifies the application and illustrates how the application functions, for example, how different portions of the application interact with other portions, how the application runs, and the like. From the received information, the system may parse the received information and perform an analysis to infer some additional information of the application. The analysis may also be performed without first parsing the received information. One or more analyses may be performed and may include a runtime analysis, data analysis, static code analysis, dependency analysis, logs analysis, program analysis, or the like.

Any analysis performed assists the system in trying to understand the received information and the application. For example, the system may parse the source code and identify access points, code portions that perform a particular function, a number of classes within the code, operations that are performed, the resources (e.g., tables, files, etc.) used by the application, etc.), code dependencies, and the like. The system may also identify or infer other information regarding the application, for example, the programming language that was used to program the application, runtimes, resource usage and allocations, and the like. The received information and the additional information can be used to identify information about the application in order to identify how the application could be split into different modules, portions, or micro services.

In order to provide a more consistent visualization, which is discussed in more detail below, the system may map the information and additional information into a data schema or data model. The data schema or data model that is used is a common data schema or data model that is used for any application that is being split into modules. Using a common data model provides all of the received and additional information into a common format. The common format allows the system to provide a consistent visualization regardless of the application or details about the application. As an example, the visualization will be of a similar format and look similar for two applications even if the applications are written using different programming languages which results in different formatting, different definitions, and the like, across the two applications, by using the common data model.

At 102, the system identifies a plurality of possible sets of modules for splitting the application. Since a single application can be split into different modules utilizing different splitting techniques, the system identifies different sets of modules, each corresponding to a different splitting technique. Example splitting techniques include, but are not limited to, splitting the application based upon most commonly used functions, splitting the application based upon resource usage, splitting the application based upon function dependencies, splitting the application based upon runtimes, splitting the application based upon code functions, and the like. Different splitting techniques can result in the same portion of the application being located in different modules or partitions, referred to as contrasting partitions.

Accordingly, each splitting technique has a corresponding set of modules that would be the result of splitting the application utilizing the splitting technique. It should be noted that multiple splitting techniques may be employed in conjunction. For example, one splitting technique may be used as a primary splitting technique and, if the resulting modules are too large, another splitting technique may be employed to split these modules into smaller modules. Thus, the system identifies more than one set of modules that the application could be split into. In other words, the system performs an analysis on the application and utilizes different splitting techniques to identify sets of modules for each of the utilized splitting techniques. Since a splitting technique has not yet been selected, each of the sets of modules represents a possible set of modules that the application can be split into.

In order to identify the sets of modules the system may employ an unsupervised clustering algorithm. In the unsupervised clustering algorithm, different portions of the application are treated as nodes. The portion treated as a node may be a portion of the application that needs to be retained together in order to maintain the functionality or integrity of the portion. For example, a portion may be a code section that performs a single function. If the code was split into smaller portions, the code would not be able to perform the desired function. Thus, while a module of the application may be a portion of the code that can perform multiple functions, the portions of the application that are treated as a node are those that perform a single function.

Once the application is grouped into nodes, the system can employ an unsupervised clustering algorithm to group nodes. Generally an unsupervised clustering algorithm works to group similar nodes together into a single cluster. In order to determine if one node is similar to another, the system may be provided with requirements or other constraints from a user. For example, a user may indicate particular resource usage requirements, runtime requirements, maximum class or object requirements, maximum module sizes, and the like. Using the provided requirements or constraints the system is able to cluster the nodes into clusters that meet or fulfill the desired requirements or constraints. Since different cluster sets could fulfill the requirements or constraints depending on the splitting technique used, the system iteratively performs the clustering algorithm to generate different sets of clusters. Each of the resulting sets of clusters represents a possible set of modules that the application can be split into.

Once the system has identified a plurality of possible sets of modules, the system provides an interactive visualization of the application split into the modules at 103. The visualization may display the different possible sets of modules as different layers within the visualization. If the sets of modules are identified using the clustering algorithm, the visualization may display different modules as nodes. Since the visualization is an interactive visualization, the user can provide input into the visualization to cause different views within the visualization. For example, possible modules may be displayed as different layers within the visualization. Thus, a user may select a desired splitting technique within the visualization and the resulting overlay or layer may display the modules or nodes that correspond to the selected splitting technique.

Different layers or overlays may also correspond to different technical or business features of an application. In other words, a single layer may correspond to a particular technical feature and, therefore, a group of layers may need to be selected in order to visualize how the application would be split into modules. As the user interacts with the visualization by selecting different layers or overlays, the visualization may display the selected business or technical features that correspond to the splitting technique. This allows a user to understand how the splitting technique will affect the application and the function of the application. For example, the user may select layers to display dependencies which would provide an overlay that illustrates the dependencies of the modules. If the user provides further input to display an additional overlay, the visualization would be updated to display the information associated with the selected overlay.

The visualization may also display different attributes or metrics regarding the application. For example, dependencies between modules or nodes may be identified using lines connecting modules or nodes, metrics may be displayed on or near the nodes or may be displayed in a window within the visualization, possible modules may be displayed with circles encompassing the nodes, or the like. The interactive visualization, therefore, allows a user to view the application from different perspectives. In other words, the user can select different attributes, metrics, layers, overlays, or the like, within the visualization to see how the application would be split based upon different splitting techniques. As the user interacts with the visualization the input provided by the user within the visualization can be used by the system to refine or modify the splitting technique illustrated in the visualization.

The system may also provide a recommendation for a splitting technique. This recommendation may be based upon any requirements, constraints, feedback, or other input provided by the user. For example, a user may indicate that each module should fall within a particular resource usage maximum, keep dependent application portions together, and should not exceed a particular object size. Based upon these requirements and constraints, the system may identify the splitting technique that results in modules fulfilling these requirements and constraints. This may be provided as a recommended splitting technique or module set to the user for splitting the application. In providing the recommendation the system may also provide an explanation for the recommendation. In other words, the system may provide reasoning for why a module set for splitting the application is recommended. For example, the system may indicate that a recommended module set fulfills a particular requirement or constraint.

Additionally, the visualization may provide an indication of particular metrics or attributes within the visualization itself. For example, if the user desires that the splitting technique meets a certain metric requirement, the visualization may include a window that indicates a value of the metric. As the user interacts with the visualization the metric value may be updated as different splitting techniques are selected within the visualization. The user may also set a desired value of a metric which will identify all the splitting techniques that meets the set requirement. If a particular splitting technique does not meet the desired metric, the visualization may change an attribute of the metric to indicate that it does not match the desired value. For example, the visualization may change the color of the metric value, may highlight the metric value, may provide a pop-up or error message indicate that the desired metric value is no longer being met, or the like.

As the user interacts with the visualization, the user may provide input to select one of the possible sets of modules for splitting the application. If the user has not provided input indicating that a final module set has been chosen at 104, the system may take no action at 105 and allow the user to continue to interact with the visualization. If the user indicates that a final module set has been selected at 104, the system may split the application into one of the possible sets of modules based upon the layer or module set selected by the user. In other words, responsive to receiving user input with the visualization selecting and affirming one of the layers or module sets, the system may split the application into the module set corresponding to the selected layer or module set.

Figure 2:
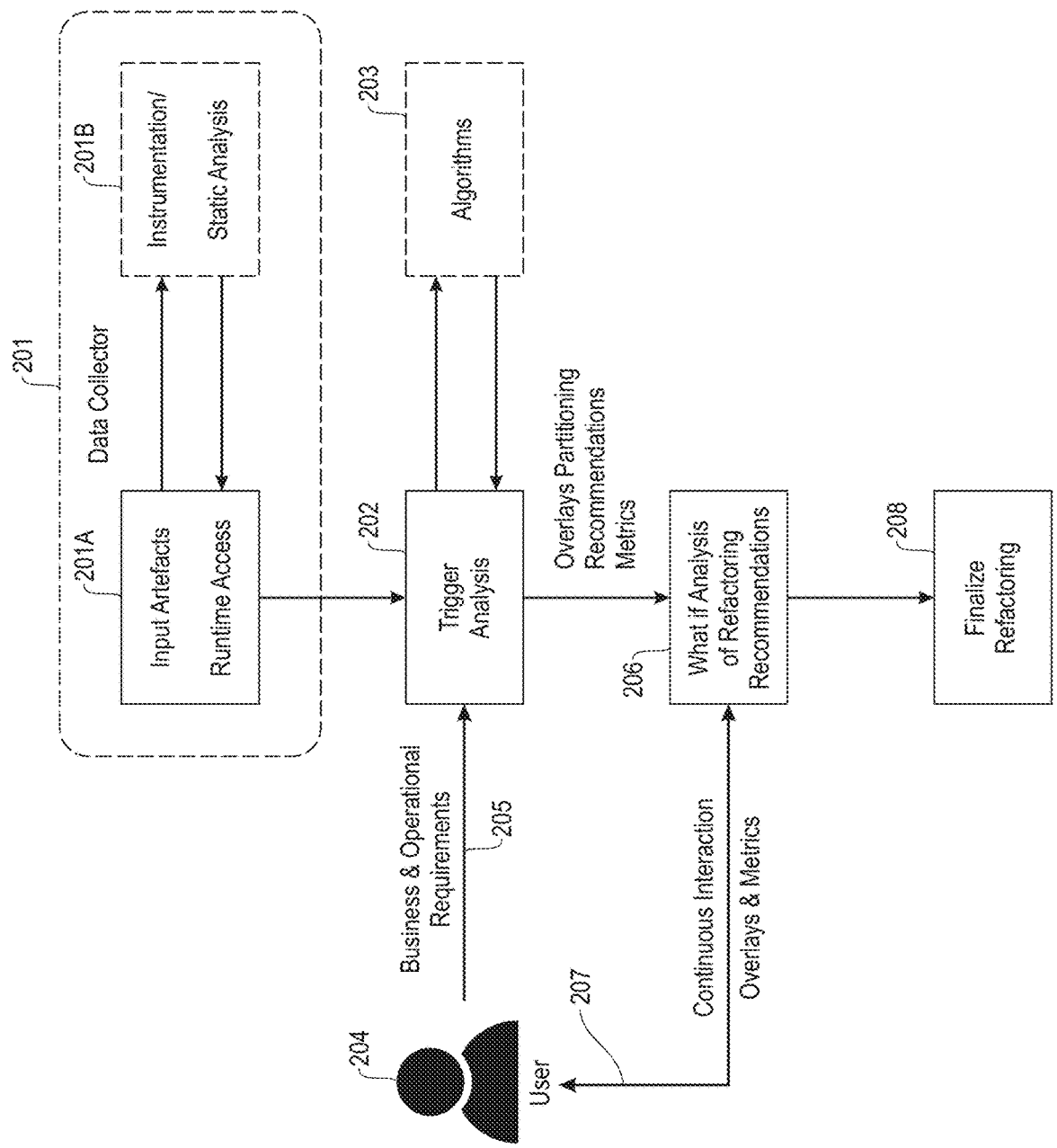
FIG. 2 illustrates an example overall system architecture for identifying sets of modules that an application can be split into and providing a visualization for a user to see the possible module sets, interact with the visualization, and select, within the visualization, a set of modules that the application should be split into.

FIG. 2 illustrates an overall system architecture of the described system and method. The system receives information regarding an application at a data collector 201. The information may include input artefacts and runtime access information 201A. From this information the system may perform a static analysis 201B to infer additional information. Additionally, instrumentation may be performed on the code to insert logging statements into the code so that appropriate logs can be generated. However, this is not always required. Once the information and additional information is discovered, the system triggers a module analysis 202 to identify possible module sets. In identifying the possible module sets the system may utilize algorithms 203 and may perform the analysis in view of requirements 205 or other constraints provided by a user 204.

Once the analysis is performed the system generates a visualization by identifying overlays, partitioning recommendations, and metric values. Within the visualization the user 204 can provide continuous interaction that results in changes to the overlays and metrics 207. This continuous user interaction 207 causes different refactoring or splitting recommendations 206. In other words, the system performs a what-if analysis of refactoring recommendations 206 based upon the continuous interaction 207 of the user 204 within the visualization. Once the user has selected a desired splitting technique, the refactoring or splitting of the application is finalized 208. It should be noted that the user does not have to choose a single splitting technique. Rather, the user may choose portions of different splitting techniques to split different modules of the application, rearrange clusters within a module, or the like. Thus, the "desired splitting technique" may be a conglomeration of multiple splitting techniques depending on the user's input.

Figure 3:
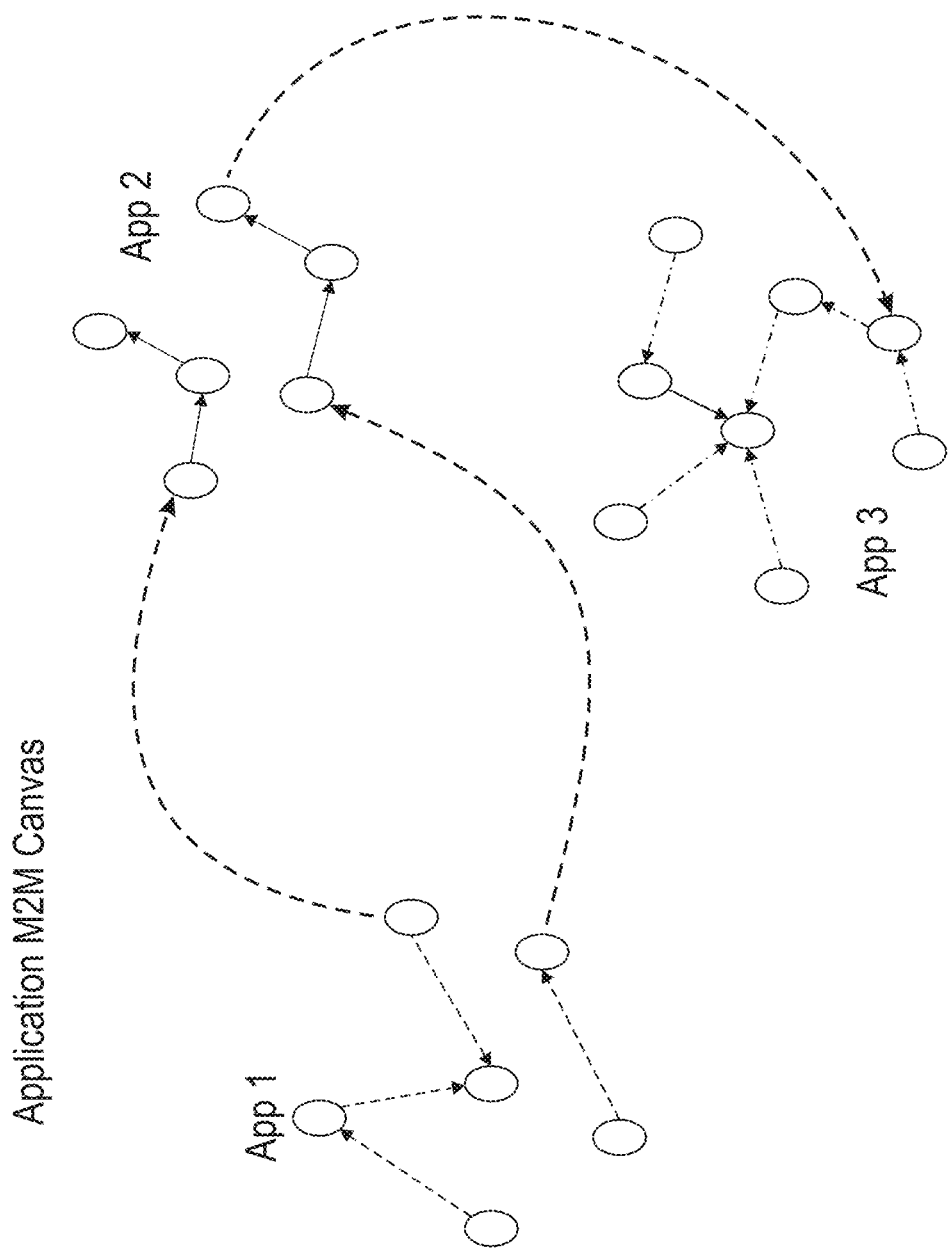
FIG. 3 illustrates an example visualization of an application with a single overlay layer.
Figure 4:
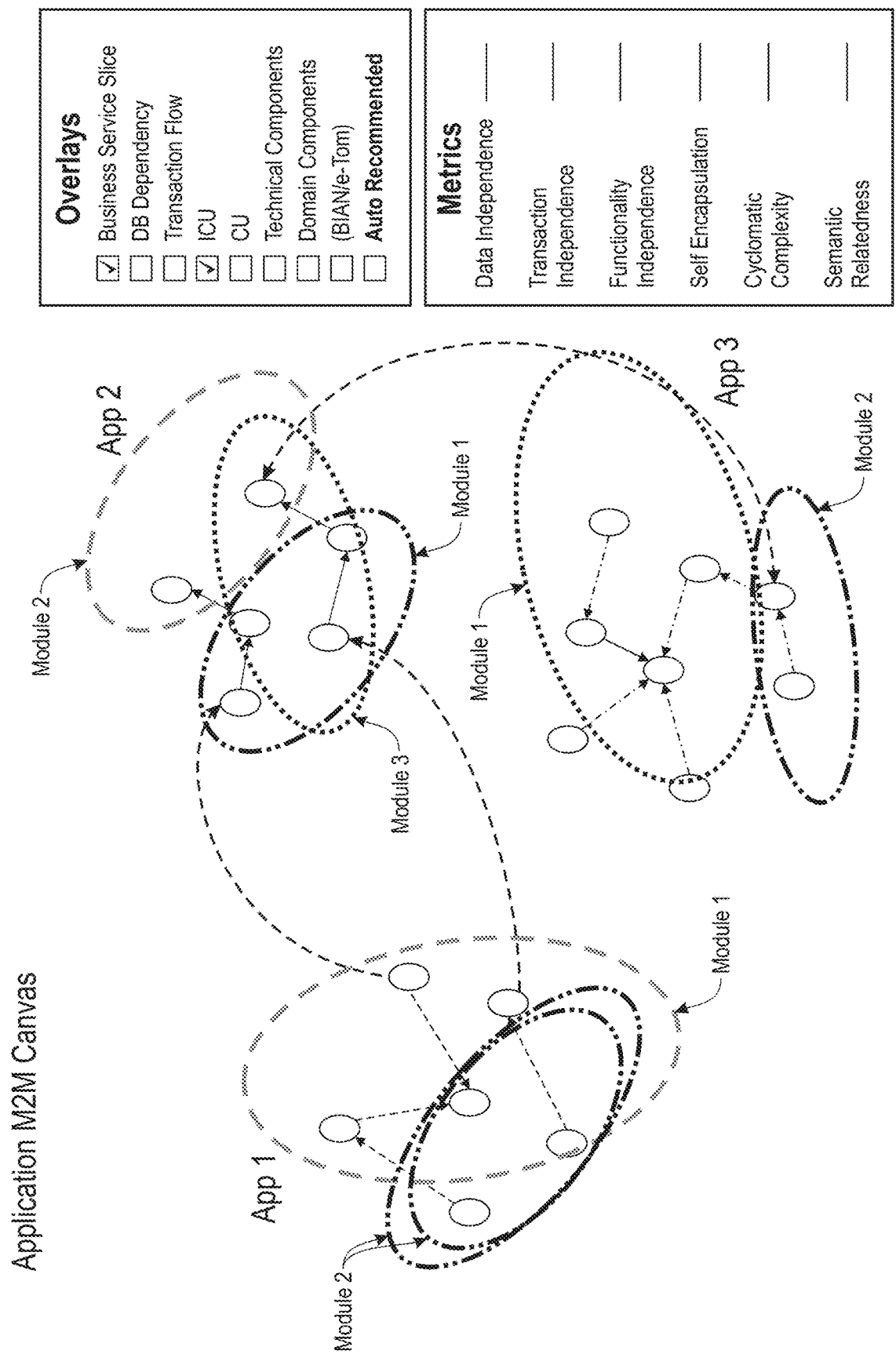
FIG. 4 illustrates an example visualization of an application with a plurality of overlay layers.

FIGS. 3 and 4 illustrate example visualizations. FIG. 3 illustrates a visualization with a single layer displayed. In this case, the single layer corresponds to the ICU (Inter-Class Usage) split. This layer or overlay captures program dependencies, which is referred to as Inter-Program Usage more generically. This visualization illustrates a splitting technique for the application where the application has been grouped into clusters. FIG. 4 illustrates the same application with an additional layer, the business service slice layer, which can split the module based upon business functions. As illustrated in FIGS. 3 and 4, the user could select other overlays that would result in additional information being displayed within the visualization. Additionally illustrated in the visualization is a metrics window that, if selected by the user or provided as a constraint, would be updated to display different metric values.

Figure 5:
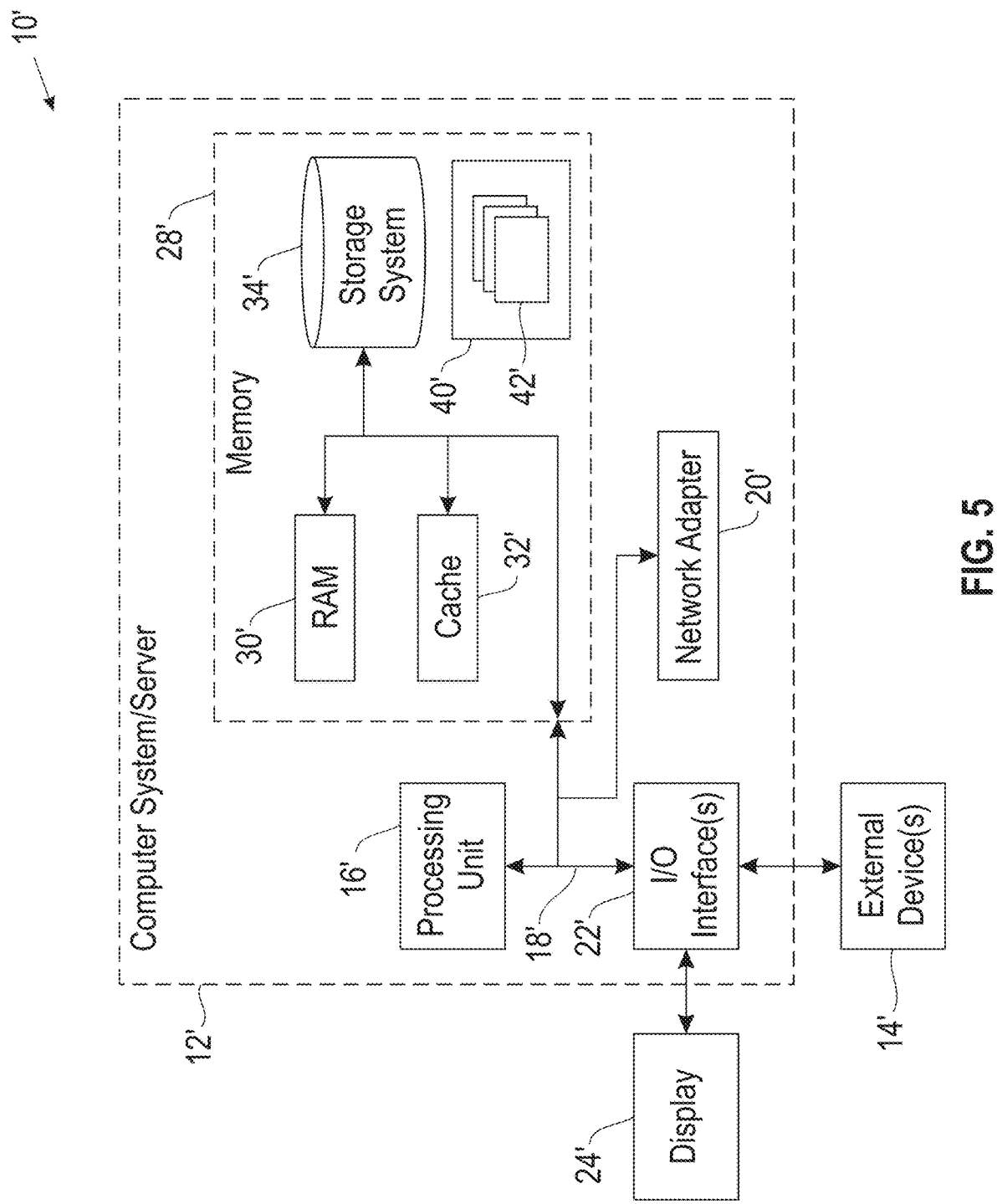
FIG. 5 illustrates a computer system.

As shown in FIG. 5, computer system/server 12' in computing node 10' is shown in the form of a general-purpose computing device. The components of computer system/server 12' may include, but are not limited to, at least one processor or processing unit 16', a system memory 28', and a bus 18' that couples various system components including system memory 28' to processor 16'. Bus 18' represents at least one of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system/server 12' typically includes a variety of computer system readable media. Such media may be any available media that are accessible by computer system/server 12', and include both volatile and non-volatile media, removable and non-removable media.

System memory 28' can include computer system readable media in the form of volatile memory, such as random access memory (RAM) 30' and/or cache memory 32'. Computer system/server 12' may further include other removable/non-removable, volatile/non-volatile computer system storage media. By way of example only, storage system 34' can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 18' by at least one data media interface. As will be further depicted and described below, memory 28' may include at least one program product having a set (e.g., at least one) of program modules that are configured to carry out the functions of embodiments of the invention.

Program/utility 40', having a set (at least one) of program modules 42', may be stored in memory 28' (by way of example, and not limitation), as well as an operating system, at least one application program, other program modules, and program data. Each of the operating systems, at least one application program, other program modules, and program data or some combination thereof, may include an implementation of a networking environment. Program modules 42' generally carry out the functions and/or methodologies of embodiments of the invention as described herein.

Computer system/server 12' may also communicate with at least one external device 14' such as a keyboard, a pointing device, a display 24', etc.; at least one device that enables a user to interact with computer system/server 12'; and/or any devices (e.g., network card, modem, etc.) that enable computer system/server 12' to communicate with at least one other computing device. Such communication can occur via I/O interfaces 22'. Still yet, computer system/server 12' can communicate with at least one network such as a local area network (LAN), a general wide area network (WAN), and/or a public network (e.g., the Internet) via network adapter 20'. As depicted, network adapter 20' communicates with the other components of computer system/server 12' via bus 18'. It should be understood that although not shown, other hardware and/or software components could be used in conjunction with computer system/server 12'. Examples include, but are not limited to: microcode, device drivers, redundant processing units, external disk drive arrays, RAID systems, tape drives, and data archival storage systems, etc.

This disclosure has been presented for purposes of illustration and description but is not intended to be exhaustive or limiting. Many modifications and variations will be apparent to those of ordinary skill in the art. The embodiments were chosen and described in order to explain principles and practical application, and to enable others of ordinary skill in the art to understand the disclosure.

Although illustrative embodiments of the invention have been described herein with reference to the accompanying drawings, it is to be understood that the embodiments of the invention are not limited to those precise embodiments, and that various other changes and modifications may be affected therein by one skilled in the art without departing from the scope or spirit of the disclosure.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions. These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer implemented method, comprising:
    creating a data schema in a common data model from an analysis of an application;
    based on the data schema, creating one or more nodes from the application by an unsupervised clustering algorithm, wherein the one or more nodes are portions of the application;
    for each of a plurality of defined constraints and splitting techniques, iteratively generating one or more clusters from the one or more nodes, wherein each cluster is a possible set of modules and wherein a constraint includes a resource usage requirement, a runtime requirement, a maximum class or object requirement, a maximum module size;
    displaying on a graphical user interface on a display device, a first visualization layer corresponding to a first possible set of modules, accompanied by an input area, wherein the input area accepts at least one checkbox selection, each checkbox selection corresponding to a splitting technique;
    iteratively displaying within the graphical user interface on the display device, one or more subsequent visualization layers of the possible set of modules, wherein each subsequently displayed visualization layer overlays a previously displayed visualization layer, leaving each previously displayed visualization layer having a selected checkbox selection visible; and
    splitting the application into one of the different possible sets of modules, responsive to receiving user input within the interactive overlay visualization selecting one of the different layers as a final module set for splitting the application.

2. The method of claim 1, comprising inferring additional information about the application by parsing and analyzing the information describing the application.

3. The method of claim 2, comprising mapping the information describing the application and the additional information into a data model.

4. The method of claim 1 further comprising, identifying and treating portions of the information as the node and utilizing the unsupervised clustering algorithm on the nodes to identify nodes belonging to a single cluster.

5. The method of claim 1, wherein the interactive overlay visualization accepts input from a user to display different ones of the different possible sets of modules based upon a desired application perspective.

6. The method of claim 1, wherein the interactive overlay visualization comprises selections for splitting the application based upon metrics.

7. The method of claim 1, comprising providing a recommendation of one of the different possible sets of modules based upon requirements provided by a user.

8. The method of claim 7, wherein the providing a recommendation comprises providing an explanation for the recommendation.

9. The method of claim 1, comprising re-identifying sets of modules based upon feedback provided by the user regarding the plurality of possible sets of modules.

10. The method of claim 1, wherein the information comprises at least one of: a source file corresponding to the application and code corresponding to the application.

11. An apparatus, comprising:
at least one processor; and
a computer readable storage medium having computer readable program code embodied therewith and executable by the at least one processor, the computer readable program code comprising:
computer readable program code to create a data schema in a common data model from an analysis of an application;
computer readable program code to, based on the data schema, create one or more nodes from the application by an unsupervised clustering algorithm, wherein the one or more nodes are portions of the application;
computer readable program code to, for each of a plurality of defined constraints and splitting techniques, iteratively generating one or more clusters from the one or more nodes, wherein each cluster is a possible set of modules, and wherein a constraint includes a resource usage requirement, a runtime requirement, a maximum class or object requirement, a maximum module size;
computer readable program code to display on a graphical user interface on a display device, a first visualization layer corresponding to a first possible set of modules, accompanied by an input area, wherein the input area accepts at least one checkbox selection, each checkbox selection corresponding to a splitting technique;
computer readable program code to iteratively display within the graphical user interface on the display device, one or more subsequent visualization layers of the possible set of modules, wherein each subsequently displayed visualization layer overlays a previously displayed visualization layer, leaving each previously displayed visualization layer having a selected checkbox selection visible; and
computer readable program code to split the application into one of the different possible sets of modules, responsive to receiving user input within the interactive overlay visualization selecting one of the different layers as a final module set for splitting the application.

12. A computer program product, comprising:
a non-transitory tangible computer readable storage medium having computer readable program code embodied therewith, the computer readable program code executable by a processor and comprising:
computer readable program code to create a data schema in a common data model from an analysis of an application;
computer readable program code to, based on the data schema, creating one or more nodes from the application by an unsupervised clustering algorithm, wherein the one or more nodes are portions of the application;
computer readable program code to for each of a plurality of defined constraints and splitting techniques, iteratively generate one or more clusters from the one or more nodes, wherein each cluster is a possible set of modules, and wherein a constraint includes a resource usage requirement, a runtime requirement, a maximum class or object requirement, a maximum module size;
computer readable program code to display on a graphical user interface on a display device, a first visualization layer corresponding to a first possible set of modules, accompanied by an input area, wherein the input area accepts at least one checkbox selection, each checkbox selection corresponding to a splitting technique;
computer readable program code to iteratively display within the graphical user interface on the display device, one or more subsequent visualization layers of the possible set of modules, wherein each subsequently displayed visualization layer overlays a previously displayed visualization layer, leaving each previously displayed visualization layer having a selected checkbox selection visible; and
computer code to split the application into one of the different possible sets of modules, responsive to receiving user input within the interactive overlay visualization selecting one of the different layers as a final module set for splitting the application.

13. The computer program product of claim 12, comprising inferring additional information about the application by parsing and analyzing the information describing the application.

14. The computer program product of claim 13, comprising mapping the information describing the application and the additional information into a data model.

15. The computer program product of claim 12, wherein the identifying comprises treating portions of the information as a node and utilizing an unsupervised clustering algorithm on the nodes to identify nodes belonging to a single cluster.

16. The computer program product of claim 12, wherein the interactive overlay visualization accepts input from a user to display different ones of the different possible sets of modules based upon a desired application perspective.

17. The computer program product of claim 12, wherein the interactive overlay visualization comprises selections for splitting the application based upon metrics.

18. The computer program product of claim 12, comprising providing a recommendation of one of the different possible sets of modules based upon requirements provided by a user.

19. The computer program product of claim 18, wherein the providing a recommendation comprises providing an explanation for the recommendation.

20. The computer program product of claim 12, comprising re-identifying sets of modules based upon feedback provided by the user regarding the plurality of possible sets of modules.

* * * * *